(12) United States Patent
Fang et al.

(10) Patent No.: US 10,317,036 B2
(45) Date of Patent: Jun. 11, 2019

(54) LIGHT GUIDING DEVICE AND VEHICLE LAMP

(71) Applicant: VALEO LIGHTING HUBEI TECHNICAL CENTER Co. Ltd., Wuhan (CN)

(72) Inventors: Zhao Fang, Wuhan (CN); Chen Chen, Wuhan (CN); Yagui Gao, Wuhan (CN)

(73) Assignee: VALEO LIGHTING HUBEI TECHNICAL CENTER Co. Ltd., Wuhan (CN)

( * ) Notice: Subject to any disclaimer, the term of this patent is extended or adjusted under 35 U.S.C. 154(b) by 111 days.

(21) Appl. No.: 15/519,409

(22) PCT Filed: Oct. 14, 2015

(86) PCT No.: PCT/CN2015/091917
§ 371 (c)(1),
(2) Date: Apr. 14, 2017

(87) PCT Pub. No.: WO2016/058530
PCT Pub. Date: Apr. 21, 2016

(65) Prior Publication Data
US 2017/0234500 A1    Aug. 17, 2017

(30) Foreign Application Priority Data
Oct. 14, 2014    (CN) ..................... 2014 2 0592601 U

(51) Int. Cl.
*B60Q 1/00* (2006.01)
*F21S 43/235* (2018.01)
(Continued)

(52) U.S. Cl.
CPC .......... *F21S 43/235* (2018.01); *B60Q 1/0011* (2013.01); *F21S 43/237* (2018.01);
(Continued)

(58) Field of Classification Search
CPC ..................................................... F21S 43/235
See application file for complete search history.

(56) References Cited

U.S. PATENT DOCUMENTS

| 8,752,986 | B2 | 6/2014 | Wuerthele et al. |
| 2006/0146555 | A1 | 7/2006 | Inaba |
| 2012/0051077 | A1 | 3/2012 | Arai |

FOREIGN PATENT DOCUMENTS

CN    204084130 U    1/2015

OTHER PUBLICATIONS

International Search Report and Written Opinion dated Jan. 7, 2016 in PCT/CN15/091917 filed Oct. 14, 2015.

*Primary Examiner* — Joseph L Williams
(74) *Attorney, Agent, or Firm* — Oblon, McClelland, Maier & Neustadt, L.L.P.

(57) ABSTRACT

The present utility model discloses a light guiding device and a vehicle lamp. The light guiding device includes a light guide medium component configured to allow light to be transmitted through it from one end thereof to another end thereof. A light guide fixing component is arranged on the light guide medium component and configured to fix the light guide medium component, wherein the light guide medium component and the light guide fixing component are both at least partly made of a transparent material. The light guide fixing component has a light directing portion configured to direct the light leaked from the light guide medium component into the light guide fixing component to exit the light guide fixing component away from a predetermined direction. Using the light guiding device and the vehicle lamp according to the present utility model can prevent light exiting the light guide fixing component from forming undesirable light spots in an undesirable direction.

20 Claims, 3 Drawing Sheets

(51) Int. Cl.
 *F21S 43/237* (2018.01)
 *F21S 43/245* (2018.01)
 *F21S 43/247* (2018.01)
 *F21S 43/27* (2018.01)
(52) U.S. Cl.
 CPC ........... *F21S 43/245* (2018.01); *F21S 43/247* (2018.01); *F21S 43/27* (2018.01)

LIGHT GUIDING DEVICE AND VEHICLE LAMP

CROSS-REFERENCE TO RELATED APPLICATION

This application claims the benefit of Chinese Patent Application No. 201420592601.1 filed on Oct. 14, 2014 in the State Intellectual Property Office of China, the disclosure of which is incorporated in entirety herein by reference.

BACKGROUND OF THE INVENTION

Field of the Invention

The present disclosure relates to the lighting field, in particular to a light guiding device and a vehicle lamp having the light guiding device.

Description of the Related Art

In the lighting field, light guide media adapted to transmit and guide a light are well-known, for example, optical fibers, light guide bars. However, in order to fix the light guide media, certain fixing components such as grippers, clips are typically provided on the light guide media. These fixing components may change the original optical guide construction of a light guiding device such that the light traveling in the light guide media may be leaked into the fixing components. Such leaked light may exit the fixing components in an undesired direction to cause an undesired bright spot. For example, when the light guide media are used in a vehicle lamp, such undesired bright spot may cause poor lit effects of the vehicle lamp.

SUMMARY OF THE INVENTION

An object of the present disclosure is to provide a light guiding device that can avoid undesired bright spots due to light leakage at the fixing component.

Another object of the present disclosure is to provide a vehicle lamp comprising the light guiding device, which can avoid the interference of the above undesired bright spot to the lit effect of the lamp.

An embodiment of the present invention provides a light guiding device, comprising:

a light guide medium component configured to guide a light to be transmitted through it from one end thereof to another end thereof; and a light guide fixing component arranged on the light guide medium component and configured to fix the light guide medium component, wherein the light guide medium component and the light guide fixing component are both at least partly transparent, and wherein the light guide fixing component has a light directing portion configured to direct the light, which is leaked from the light guide medium component into the light guide fixing component, to exit the light guide fixing component in a direction deviated from a predetermined direction.

In an embodiment, the light directing portion has one or more light deflection outgoing face/faces through which the light leaked from the light guide medium component into the light guide fixing component passes to exit the light guide fixing component, and the light deflection outgoing face/faces is/are oriented to deviate the light passing through the light deflection outgoing face/faces, from the predetermined direction.

In an embodiment, the light directing portion has one or more light deflection incidence face/faces by which the light leaked from the light guide medium component is deflected into the light guide fixing component.

In an embodiment, the light deflection outgoing face/faces is/are formed by a cut corner.

In an embodiment, the light deflection outgoing face/faces is/are a cambered surface/cambered surfaces, or an inclined surface/inclined surfaces with respect to a surface of the light guide medium component.

In an embodiment, the orientation of the light deflection outgoing face/faces depends on the refractive index of the light guide medium component, the refractive index of the light guide fixing component, an incident direction of the light leaked from the light guide medium component into the light guide fixing component and the predetermined direction.

In an embodiment, the light deflection outgoing face/faces is/are arranged at an angle/angles of 20 degrees to 90 degrees relative to the surface of the light guide medium component.

In an embodiment, the light directing portion further has an intermediate light deflection face arranged in an optical path between the light deflection outgoing face/faces and the location at which the light is leaked into the light guide fixing component to deflect the light in advance before the light reaches the light deflection outgoing face/faces.

In an embodiment, the predetermined direction is a direction which is visible to human eyes.

In an embodiment, the light guide medium component and the light guide fixing component are formed integrally.

In an embodiment, the light guide medium component transmits the light by means of total reflection.

An embodiment of the present invention provides a vehicle lamp comprising:

the light guiding device as described in any one of the above embodiments; and a light source which is located at the outside of an end of the light guide medium component and has a light emitting direction facing toward the end of the light guide medium component.

In an embodiment, the predetermined direction is the direction along which a lamp light is emitted from the lamp.

At least one above embodiments of the present disclosure can control the light emitting direction of the light by providing a light directing portion on the light guide fixing component. By means of the light guiding device and vehicle lamp according to the present disclosure, the light emitted from the light guide fixing component may be prevented from forming an undesired bright spot in undesired directions.

DETAILED DESCRIPTION OF PREFERRED EMBODIMENTS

The embodiments of the present invention will be further explained below with reference to the figures and examples. Throughout the description, same or similar reference numbers indicate the same or similar members. The following embodiments along with the figures are only used to explain the general concept of the present invention, instead of being intended to limit the scope of the present invention.

Figure 1:
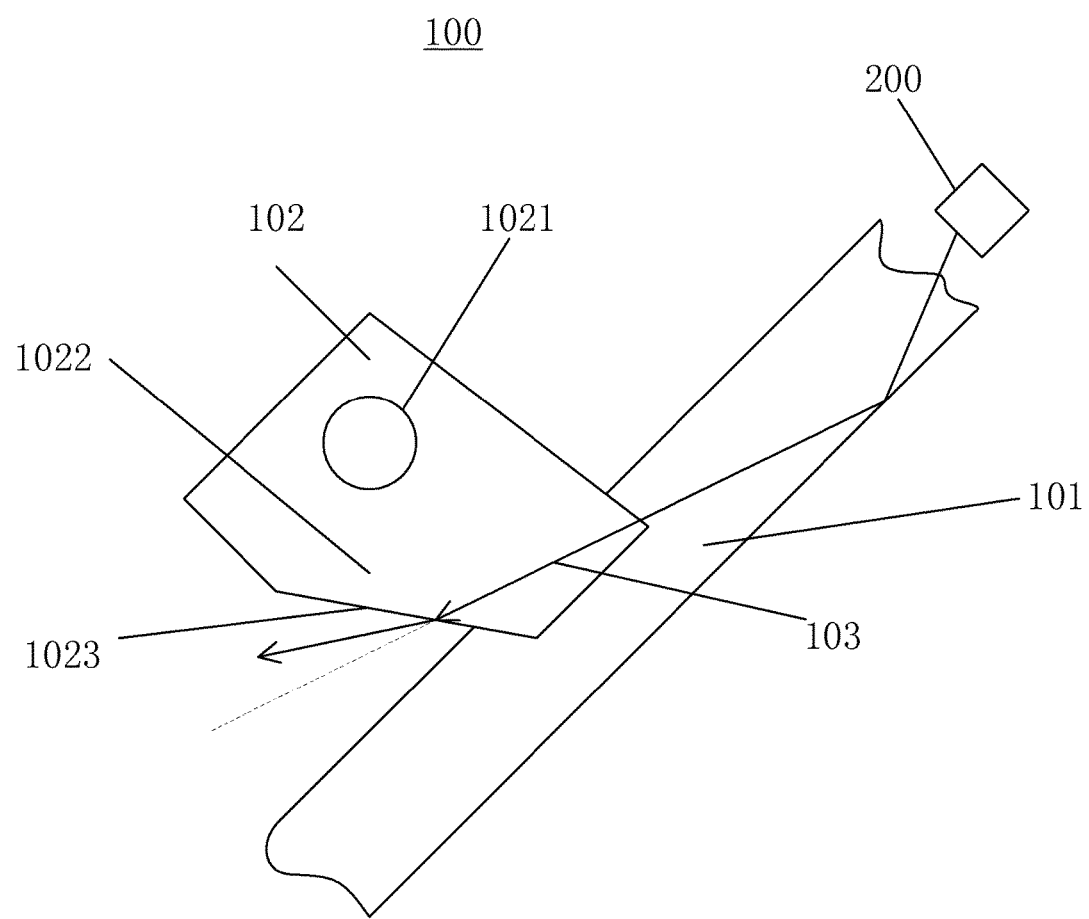
FIG. 1 is a schematic view showing a light guiding device according to an embodiment of the present invention.

FIG. 1 schematically shows a light guiding device 100 according to an embodiment of the present invention. The light guiding device 100 comprises a light guide medium component 101 and a light guide fixing component 102. The light guide medium component 101, such as an optical fiber or a light guide bar, is configured to guide a light to be transmitted through it from one end thereof to another end thereof. The light guide fixing component 102 is arranged on the light guide medium component 101 and configured to fix the light guide medium component 101. The light guide fixing component 102 has a light directing portion 1022 configured to direct the light 103, which is leaked from the light guide medium component 101 into the light guide fixing component 102, to exit the light guide fixing component 102 in a direction deviated from a predetermined direction. As an example, in order to fix the light guide medium component 101 on an apparatus such as a wall, a casing, or a shield, the light guide fixing component 102 may be provided with a connecting portion 1021 such as a connecting hole, or a connecting groove. The light guide medium component 101 and the light guide fixing component 102 may both be made from at least partly transparent material, on other words, the light guide medium component 101 and the light guide fixing component 102 are both at least partly transparent themselves.

Arrangement of the light guide fixing component 102 may affect, or even destroy the optical guide construction of the light guide medium component 101 locally such that the light is leaked into the light guide fixing component 102 from the light guide medium component 101. In an example, the light guide medium component 101 such as an optical fiber, a light guide bar or a light guide plate, may transmit the light by means of total reflection to reduce the power consumption loss. However, it needs the reflection of the light at a reflective interface to meet the total reflection condition. In this way, the light guide medium component 101 needs to have a certain shape, for example of uniform cylindrical shape. The arrangement of the light guide fixing component 102 may change the local shape of the light guide medium component 101 such that the total reflection condition will not be met at the original reflective interface of the light 103. Thus, the light 103 may be leaked into the light guide fixing component 102 from the light guide medium component 101 and finally exit the light guide fixing component 102.

It is the light directing portion 1022 that is configured to control the direction along which the light leaked into the light guide fixing component 102 exits the light guide fixing component 102. If the direction is not controlled, the light exiting the light guide fixing component 102 may cause an undesired bright spot. The light directing portion 1022 can direct the light, which is leaked from the light guide medium component 101 into the light guide fixing component 102, to exit the light guide fixing component 102 in a direction deviated from the predetermined direction. For example, the predetermined direction may be a direction which is visible to human eyes and the bright spot produced in the direction may cause the eyes to feel uncomfortable. Or in another example, the predetermined direction may be a direction in which a lamp emits a light and the bright spot produced in the direction may change the light intensity distribution to affect the lighting or lit effect. The light directing portion 1022 may avoid producing an undesired bright spot and thus correspondingly avoid the above issues caused by such bright spot.

Figure 2:
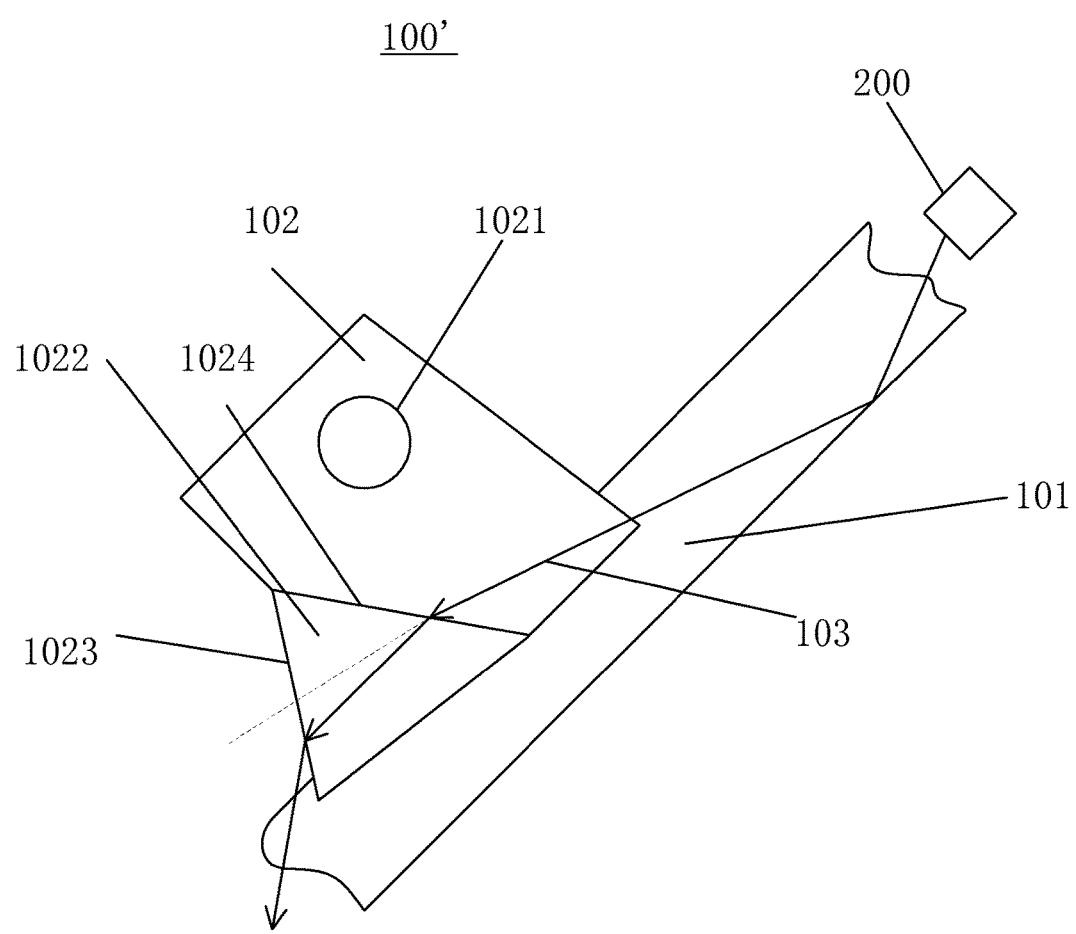
FIG. 2 is a schematic view showing a light guiding device according to another embodiment of the present invention.

As an example, the light directing portion 1022 may have one or more light deflection outgoing face/faces 1023 through which the light leaked from the light guide medium component 101 into the light guide fixing component 102 passes to exit the light guide fixing component 102. The light deflection outgoing face/faces 1023 is/are oriented to deviate the light passing through the light deflection outgoing face/faces 1023, from the predetermined direction. When the light guide fixing component 102 is made from the transparent materials, change of the direction of the light deflection outgoing face/faces 1023 can change the direction in which the light exits the light deflection outgoing face/faces 1023 due to refraction effect. By adjusting the direction of the light deflection outgoing face/faces 1023, for example an angle/angles of the light deflection outgoing face/faces 1023 relative to the surface of the light guide medium component 101, the direction in which the light exits the light deflection outgoing face/faces 1023 may be deviated from the predetermined direction to avoid undesired bright spot presented in the undesired directions. Although FIGS. 1-2 only show one light deflection outgoing face 1023, it should be understood that the present invention is not limited to this. For example, the light directing portion 1022 may provide two or more light deflection outgoing faces 1023 in a plurality of possible light exit directions of the light guide fixing component 102 respectively to control the light exit direction. Arrows in FIGS. 1 and 2 represent the travel direction of the light. As an example, the light guide medium component 101 may have the same refractive index as that of the light guide fixing component 102 or have different refractive index from that of the light guide fixing component 102. As an example, the light deflection outgoing face/faces 1023 is/are formed by a cut corner, as illustrated in FIG. 1. Such arrangement is simple and effective. However, the light deflection outgoing face/faces 1023 may be formed by other means such as supplement. As an example, the light deflection outgoing face/faces 1023 may be a cambered surface/cambered surfaces or an inclined surface/inclined surfaces for example inclined with respect to a surface of the light guide medium component 101, to meet the requirements for controlling various light exit directions. As an example, the orientation of the light deflection outgoing face/faces 1023 may be determined depending on factors such as the refractive index of the light guide medium component 101, the refractive index of the light guide fixing component 102, an incident direction of the light leaked from the light guide medium component 101 into the light guide fixing component 102 and the above predetermined direction (i.e., the light exit direction to be avoided). For example, the light deflection outgoing face/faces 1023 is/are arranged at an angle/angles of 20 degrees to 90 degrees, for example 30 degrees to 70 degrees such as 40 degrees to 60 degrees relative to the surface of the light guide medium component 101.

Figure 3:
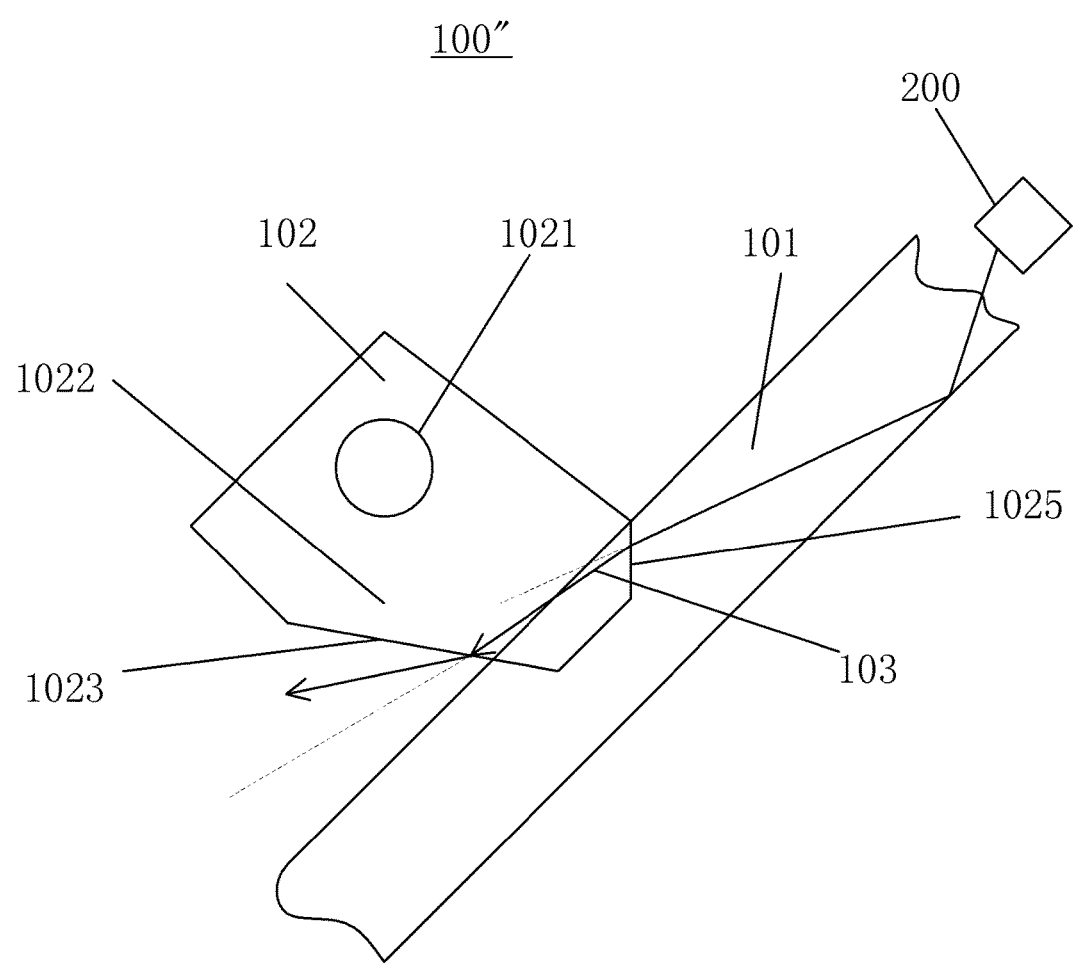
FIG. 3 is a schematic view showing a light guiding device according to a further embodiment of the present invention.

As an example, as illustrated in FIG. 3, the light directing portion 1022 further has one or more light deflection incidence face/faces 1025 by which the light leaked from the light guide medium component 101 is deflected into the light guide fixing component 102. In this case, the light guide medium component 101 may have a reflective index different from that of the light guide fixing component 102. Similar to the light deflection outgoing face/faces 1023, the light deflection incidence face/faces 1025 may also deflect the light, i.e., change the travel direction of the light. Thus, the light deflection incidence face/faces 1025 also can change the direction in which the light exits the light guide fixing component 102. As an example, the light deflection outgoing face/faces 1023 and the light deflection incidence face/faces 1025 may be used in combination. In this way, the direction in which the light exits the light guide fixing component 102 will have a greater adjustable range so as to control the light exit direction better to be deviated from the predetermined direction. In terms of the travel direction of the light, the light deflection incidence face/faces 1025 is/are located on the upstream while the light deflection outgoing face/faces 1023 is/are located on the downstream. Similar to the light deflection outgoing face/faces 1023, the light deflection incidence face/faces 1025 may also be formed by a cut corner or by other means such as supplement. Likewise, the light deflection incidence face/faces 1025 may also be a cambered surface/cambered surfaces or an inclined surface/inclined surfaces for example inclined with respect to a surface of the light guide medium component 101. And in an example, the orientation of the light deflection incidence face/faces 1025 may also be determined depending on factors such as the refractive index of the light guide medium component 101, the refractive index of the light guide fixing component 102, the incident direction of the light leaked from the light guide medium component 101 into the light guide fixing component 102 and the above predetermined direction (i.e., the light exit direction to be avoided).

In an example, as illustrated in FIG. 2, in the light guiding device 100', the light directing portion 1022 further has an intermediate light deflection face 1024 arranged in an optical path between the light deflection outgoing face/faces 1023 and the location at which the light is leaked into the light guide fixing component 102, on other words, the light leaked into the light guide fixing component 102 will be deflected by the intermediate light deflection face 1024 before it reaches the light deflection outgoing face/faces 1023. It may deflect the light in advance before the light reaches the light deflection outgoing face/faces 1023. The intermediate light deflection face 1024 may be configured to further enhance the deflection angle of the exiting light. It can further improve the control of the light exit direction in comparison with the case provided with only the light deflection outgoing face/faces 1023. Such arrangement is in particular advantageous if the parts of the light guide fixing component 102 on both sides of the interface of the intermediate light deflection face 1024 have different refractive indexes from each other.

As an example, the light guide medium component 101 and the light guide fixing component 102 may be formed integrally. It contributes to reduction of manufacturing process and assembling errors. However, it is not necessary, the light guide medium component 101 and the light guide fixing component 102 may also be manufactured separately and then assembled together.

The present disclosure also provides a vehicle lamp comprising: the light guiding device 100, 100', 100" as described in any one of the above embodiments and a light source 200. The light source 200 may be located at the outside of an end of the light guide medium component 101 and have a light emitting direction facing toward the end of the light guide medium component 101, as illustrated in FIGS. 1-3. For example, the predetermined direction (i.e., the light exit direction to be avoided) may be the direction along which a lamp light is emitted from the lamp. It may prevent undesired bright spot caused by light leakage from being contained in the lighting beam of the vehicle lamp.

Although the present disclosure is provided with reference to figures, all of the embodiments shown in figures are intended to explain the preferred embodiments of the present invention by ways of examples, instead of being intended to limit the present invention.

Apparently, it would be appreciated by those skilled in the art that various changes or modifications may be made in the present disclosure without departing from the principles and spirit of the disclosure, which are intended to be covered by the present invention as long as these changes or modifications fall within the scope defined in the claims and their equivalents.

What is claimed is:

1. A light guiding device comprising:
    a light guide medium component configured to allow a light to be transmitted through it from one end thereof to another end thereof; and
    a light guide fixing component arranged on the light guide medium component and configured to fix the light guide medium component, wherein the light guide medium component and the light guide fixing component are both at least partly transparent,
    and wherein the light guide fixing component has a light directing portion configured to direct the light leaked from the light guide medium component into the light guide fixing component to exit the light guide fixing component away from a predetermined direction, the light direction portion including an intermediate light deflection face.

2. The light guiding device according to claim 1, wherein the light directing portion has one or more light deflection outgoing face/faces through which the light leaked from the light guide medium component into the light guide fixing component passes to exit the light guide fixing component, and the light deflection outgoing face/faces is/are oriented to deflect the light exiting it away from the predetermined direction.

3. The light guiding device according to claim 2, wherein the light directing portion has one or more light deflection incident face/faces, wherein light leaked from the light guide medium component is deflected by the light deflection incident face/faces and enters the light guide fixing component.

4. The light guiding device according to claim 2, wherein the light deflection outgoing face/faces is/are formed by a cut corner.

5. The light guiding device according to claim 2, wherein the light deflection outgoing face/faces is/are an inclined face/inclined faces or a cambered face/cambered faces inclined with respect to the surface of the light guide medium component.

6. The light guiding device according to claim 2, wherein the light deflection outgoing face/faces is/are configured to form an angle of 20° to 90° with the surface of the light guide medium component.

7. The light guiding device according to claim 2, wherein the orientation of the light deflection outgoing face/faces depends on the refractive index of the light guide medium component, the refractive index of the light guide fixing component, an incident direction of the light leaked from the light guide medium component into the light guide fixing component and the predetermined direction.

8. The light guiding device according to claim 2, wherein the intermediate light deflection face arranged in an optical path between the light deflection outgoing face/faces and the location at which the light is leaked into the light guide fixing component to deflect the light in advance before it reaches the light deflection outgoing face/faces.

9. The light guiding device according to claim 8, wherein the predetermined direction is a direction which is visible to human eyes.

10. The light guiding device according to claim 8, wherein the light guide medium component and the light guide fixing component are formed integrally.

11. The light guiding device according to claim 8, wherein the light guide medium component transmits the light by means of total reflection.

12. A vehicle lamp, comprising the light guiding device according to claim 1; and a light source located outside one end of the light guide medium component, and the light emission direction of the light source facing this end of the light guide medium component.

13. The vehicle lamp according to claim 12, wherein the predetermined direction is the direction along which lamp light is emitted from the vehicle lamp.

14. The light guiding device according to claim 1, wherein the predetermined direction is a direction which is visible to human eyes.

15. The light guiding device according to claim 1, wherein the light guide medium component and the light guide fixing component are formed integrally.

16. The light guiding according to claim 1, wherein the light guide medium component transmits the light by means of total reflection.

17. The light guiding device according to claim 2, wherein the predetermined direction is a direction which is visible to human eyes.

18. The light guiding device according to claim 2, wherein the light guide medium component and the light guide fixing component are formed integrally.

19. A vehicle lamp, comprising the light guiding device according to claim 2; and a light source located outside one end of the light guide medium component, and the light emission direction of the light source facing this end of the light guide medium component.

20. The vehicle lamp according to claim 19, wherein the predetermined direction is the direction along which lamp light is emitted from the vehicle lamp.

\* \* \* \* \*